United States Patent [19]
Chaum

[11] Patent Number: 5,493,614
[45] Date of Patent: Feb. 20, 1996

[54] PRIVATE SIGNATURE AND PROOF SYSTEMS

[76] Inventor: David Chaum, 14652 Sutton St., Sherman Oaks, Calif. 91403

[21] Appl. No.: 237,098

[22] Filed: May 3, 1994

[51] Int. Cl.$^6$ .................................................. H04K 1/00
[52] U.S. Cl. .................................. 380/30; 380/28; 380/23
[58] Field of Search ................................. 380/30, 28, 23

[56] References Cited

U.S. PATENT DOCUMENTS

| | | |
|---|---|---|
| 4,748,668 | 5/1988 | Shamir et al. . |
| 4,947,430 | 8/1990 | Chaum . |
| 5,373,558 | 12/1994 | Chaum . |
| 5,406,628 | 4/1995 | Beller et al. .......................... 380/30 |

OTHER PUBLICATIONS

Chaum et al, "Demonstrating Possession of a Discrete Logarithm Without Revealing It", pp. 200–212.
Chaum et al, "An Improved Protocol For Demonstrating Possession of Discrete Logarithms and Some Generalizations", pp. 127–141, Proceeding of Eurocrypt '87, Springer–Verlag.
Chaum et al, "Wallet Databases with Observers", pp. 89–105, Proceeding of Crypto '92, Springer–Verlag.
Brassard et al, Journal of Computer and Systems Sciences, "Minimum Disclosure Proofs of Knowledge", vol. 37, No. 2, 1988, pp. 156–189.
Goldwasser et al, Siam Journal of Computing, "A Digital Signature Scheme Secure Against Adaptive Chosen–Message Attacks", vol. 17, No. 2, pp. 281–308.

*Primary Examiner*—David C. Cain
*Attorney, Agent, or Firm*—Nixon & Vanderhye

[57] ABSTRACT

Cryptographic methods and apparatus for forming (102) and verifying (103) private signatures and proofs (203,204, 207, and 209) are disclosed. Such a signature convinces the intended recipient that it is a valid undeniable or designated-confirmer signature. And such a proof convinces the intended recipient, just as any cryptographic proof. Even though the signatures and proofs are convincing to the intended recipient, they are not convincing to others who may obtain them.

Unlike previously known techniques for convincing without transferring the ability to convince others, those disclosed here do not require interaction—a signature or proof can simply be sent as a single message. Because the intended recipient can forge the signatures and proofs, they are not convincing to others; but since only the intended recipient can forge them, they are convincing to the intended recipient. Exemplary embodiments use a cryptographic challenge value that is said to pivot on a trap-door function, in that the value can be manipulated by those with the corresponding trap-door information, and is believed impractical to manipulate without it.

22 Claims, 3 Drawing Sheets

PRIVATE SIGNATURE AND PROOF SYSTEMS

BACKGROUND OF THE INVENTION

1. Field of the Invention.

This invention relates to public key cryptographic techniques, and more specifically to systems for one party to convince another, including signatures.

2. Description of Prior Art.

Included here by reference are the following and any related patents, applications, and publications: U.S. Pat. No. 4,947,430, titled "Undeniable signature systems," issued Aug. 7, 1990, to the present applicant, also as European publication 88202620.6; and U.S. application Ser. No. 08/066,669 titled "Designated confirmer signature systems."

Previously disclosed undeniable and designated confirmer signature systems, such as those referenced above, use an exchange of messages between the signer and the recipient, interactively in both directions, during the process of providing a signature. In some applications, such as electronic mail for instance, there may be advantage in the signer being able simply to form and send a signature without interacting with the recipient.

More generally, in the context of cryptographic techniques, a prover party is typically said to convince or prove something to an intended recipient party. In such situations the prover may desire to prevent others, apart from the intended recipient(s), from being convinced.

With signatures as well as more general proofs, the use of interaction as a way to limit a recipient to a single party determined by the prover may not be effective. If the intended recipient wishes to allow other parties to be convinced—even against the wishes of the prover it may be possible if the others cooperate in forming the challenge during the interaction.

OBJECTS OF THE INVENTION

Accordingly, it is an object of the present invention to:

allow signatures to be provided from a signer to a recipient in a single message that prevents signatures from being verified without limitation, but which ensures the recipient of being able to convince others of the signature's validity, either by participation of the signer or by that of third-party confirmers;

allow proofs more general than signatures to be conveyed from a prover to an intended verifier, without interaction, but with limitation on who will be convinced by the showing of the proof;

allow incorporation of known authentication systems in practical realizations of the inventive concepts disclosed herein; and allow efficient, economical, and practical apparatus and methods fulfilling the other objects of the invention.

Other objects, features, and advantages of the present invention will be appreciated when the present description and appended claims are read in conjunction with the drawing figures.

BRIEF DESCRIPTION OF THE DRAWING FIGURES

BRIEF SUMMARY OF THE INVENTION

Figure 1A:
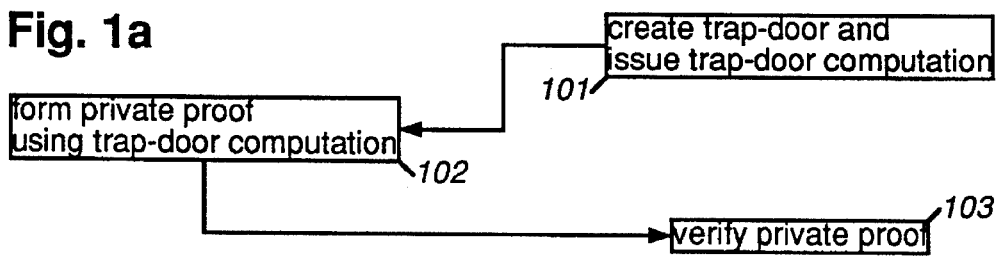
FIG. 1a shows a combination block, functional and flow diagram of a preferred embodiment of a private signature or proof configuration involving a prover party and a verifier party in accordance with the teachings of the present invention.

In accordance with the forgoing and other objects of the present invention, a brief summary of some exemplary embodiments will now be presented. Some simplifications and omissions may be made in this summary, which is intended to highlight and introduce some aspects of the present invention, but not to limit its scope in any way. Detailed descriptions of preferred exemplary embodiments adequate to allow those of ordinary skill in the art to make and use the inventive concepts are provided later.

Terminology will first be developed by describing a known technique and introducing some further elements. Then this terminology will be applied in summarizing the inventive concepts.

It will be appreciated that there are believed to be a few characteristic elements of a so called interactive proof as known in the art.

A first such element in such a proof is a "commit" to one or more parameter values. These would typically be chosen by the prover (although values chosen by the recipient are also well known). An example of a value chosen by the prover is a particular residue class whose square root might be shown by itself or multiplied with a secret square root in a "Fiat-Shamir identification" protocol, as disclosed, for instance in U.S. Pat. No. 4,748,668, May 31, 1988.

A second element in such a proof is a value referred to as the "challenge." It is believed that the unpredictability/uncontrollability to the prover of the challenge value makes the proof convincing; if the prover could freely choose any value for the challenge, the proof would be unconvincing. In the Fiat-Shamir example, this might be the choice made by the recipient of which square roots are to be shown.

A third element is the "response" that the prover issues depending on both the commit and the challenge. In Fiat-Shamir, this would be the actual square roots shown.

The fourth element is the "verification condition" applied by the recipient, to determine if the proof is convincing. It checks that the response is consistent with the combination of the commit and the challenge. This might, in Fiat-Shamir, include squaring and testing for equality.

There is a technique, well known in the art, for converting such an "interactive proof" to a non-interactive or "self-authenticating proof," like the ordinary digital signature. The prover chooses the challenge as the output of a one-way function applied to the commit. This is believed to keep the challenge substantially outside the control of the prover, and is accordingly believed to make the proof convincing to the recipient. The recipient need send nothing to the prover and the prover need send only the commit and response. To verify, the recipient applies the one-way function to the received commit, thereby obtaining the challenge, and then applies the verification condition on the received commit, constructed challenge, and received response.

An additional element, that will be used in describing the inventive concepts, will now be introduced. A "trap-door" operation is one that is substantially easy for any party to compute, but which only the intended recipient can invert (although the inverse need not be unique). An example of such a mapping is the RSA encryption function. Anyone can encrypt a message with it, but only the recipient, who holds the private key, can decrypt it.

The basic forming, transmitting, and testing of a proof or signature in accordance with the teachings of the present invention will now be summarized.

The challenge is formed as the exclusive-or of two values: the first value, is the commit; the second is the output of a trap-door one way function. (For extra security, more than a simple x-or could be used, as will be described in detail later.) Because the trap-door function without knowledge of the trapdoor information is in effect a one-way function, the output of this function may be assumed outside the control of the prover. The input to the trap-door function is believed best simply chosen by the prover at random, and will be called the "buff."

The values transmitted by the prover to the intended recipient include the commit, the buff, and the response.

To test the received proof, the intended recipient first m-creates the challenge by exclusive-or of two quantities. The first is constructed by applying the one-way function to the received commit. The second is obtained by applying the trap-door one-way function to the received buff. Testing of the verification condition is again on the received commit, constructed challenge, and received response. Of course an invalid proof, for which the verification condition fails, will not be convincing to anyone. If the verification condition succeeds, the proof is believed to be convincing to the intended recipient.

A valid proof is believed not to be convincing, however, to any party substantially other than the intended recipient. By inverting the trap-door function, the intended recipient could choose any desired challenge and create a corresponding buff. And such control over the challenge, as already mentioned above, is believed to allow arbitrary such proofs to be created. Therefor, it is believed, any such proof would be substantially unconvincing to parties other than the intended recipient, because false proofs can be created and issued by the intended recipient. But the proofs remain convincing to the intended recipient, because he knows only he can create false proofs and he knows which, if any, false proofs he has created.

Some examples of how this inventive concept might be applied to advantage are now presented.

A substantially undeniable signature can be shown convincingly to its intended recipient using private signatures. A suitable basis is believed to be an interactive proof, using a commit created by the prover, for the equivalence of two discrete log problems, such as those disclosed in: "Demonstrating possession of a discrete log without revealing it," D. Chaum, J. -H. Evertse, J. van de Graaf, & R. Peralta, in Proceeding of Crypto '86, Springer-Verlag, pp. 200–212: "An improved protocol for demonstrating possession of a discrete logarithm and some generalizations," D. Chaum, J. -H. Evertse & J. van de Graaf, in Proceeding of Eurocrypt '87, Springer-Verlag, pp. 127–141; and "Wallet databases with observers," D. Chaum & T. P. Pedersen, Proceeding of Crypto '92, Springer-Verlag, pp. 89–105.

It will be assumed, for clarity, that the message to be signed is the result of a suitable one-way or hash function applied to some mutually known meaningful or otherwise desired string. The proof will then be that the undeniable signature has the same discrete log relative to the message as the signer's public key has relative to the public generator on which it is based. The interactive confirmation and denial protocols, disclosed for instance in the above referenced "Undeniable signatures systems" may then be employed directly in the exceptional cases in which parties may wish to invoke them.

A designated confirmer signature can also be shown convincingly using a similar technique. The basic designated confirmer technique presented in "Designated confirmer signature systems," referenced above, can be applied but the proof of the signature showing part would be achieved differently.

For this it is believed sufficient to prove that the undeniable signature on a random element does in fact validly correspond to the public key of the designated confirmer (since a signature on the actual message can then be hinged on this signature on a random message). The above mentioned technique for showing the equivalence of two discrete logs can again be applied. But this time instead of showing that the generator and public key are related by the same exponent that relates the message and the signature, it is shown that the two base numbers are related by the same exponent that relates the two powers. That is, the random element has the same discrete log relative to the generator as the signature has relative to the public key.

GENERAL DESCRIPTION

The drawing figures and the detailed descriptions provided later make a number of simplifying assumptions for concreteness and for clarity in exposition. It will be appreciated, however, that these should not be taken to limit the scope of the invention.

Lines and arrows in the drawing figures, for instance, represent messages (apart from the straight lines in FIG. 1b), which may be held initially or delayed on their way, passed through various parties, encoded and decoded cryptographically or otherwise to provide their authenticity and/or secrecy and/or error detection and/or error recovery. Thus the particular means or methods whereby messages are transferred are not essential to the present invention, and it is anticipated that any technique may be employed in this regard.

The term "party" is used herein to indicate an entity with control over at least the secrecy of some information, usually at least one key. It is anticipated that a plurality of people may each know all or in effect part of some key, and they might be thought of collectively as a party. In other cases, a key may be substantially unknown to people, and reside in some physical device, and then the device itself or those who control it from time to time may be regarded as parties.

Assigning a variable a "random" value performs the function of creating a value that should not be readily determined by at least some party. Many means and methods are known in the art for generating such unpredictable quantities, often called keys. Some are based on physical phenomena, such as noise in semiconductors, or patterns detected in humans pushing buttons, or possibly deterministic cryptographic techniques sometimes called pseudorandom generators. It is well known in the art that these various techniques can often be combined, and that post-processing can often improve the results. Thus the particular means or methods whereby random values are derived is not essential to the present invention, and it is anticipated that any suitable technique may be employed in this regard.

To "convince" or "prove" something or to "transfer conviction" about something to a party are all interpreted to correspond to the notion, widely known and appreciated in the art, of a technical method or means that substantially removes doubt. Typically the removal of doubt relies on the assumption that certain computational problems are substantially intractable. It also typically accepts a probability of a party being falsely convinced, that is preferably exponentially small in a security parameter. But these typical attributes are not necessary and can sometimes be avoided.

The notion of "manipulating" an a relationship between one or more inputs and outputs is a method that gives substantial advantage over random choice of the inputs to produce a desired output or related set of outputs. For instance, a one-way function can be manipulated if it is desired to place certain output bits in a fixed configuration and input values can be found, substantially faster than by exhaustive search, that yield outputs with the desired fixed configuration. Another example would be a two input one-way function, where it is desired to find multiple pairs of inputs that result in the same output. In certain circumstances, control over certain aspects of the output or inputs may not be of interest, since it may not be know how to use them to advantage in compromising the system in which the output is embedded.

That a challenge "pivots" on a trap-door, or on a trap-door operation, is defined to mean that the challenge cannot substantially be manipulated without the trap door information and that it substantially can be substantially manipulated with the trap door information. This notion of a challenge that pivots, or "pivoting" a challenge, on a trap-door should be appreciated as a general one. As will be understood, a challenge that pivots on a trap-door is believed to provide the relative ease of a first task and the relative difficulty of a second task. The substantially feasible first task is to manipulate the challenge using the trap-door information. The substantially infeasible second task has the same objective and constraints, except that the trap-door information is not known. The ease of the first task can often be ensured directly; the hardness of the second task, it is believed, may be as difficult to verify as, for instance, the security of the underlying trap-door scheme.

In addition to the buff, which influences the pivoted challenge, there may be other inputs, such as a commit. These secondary inputs are "tied" to the resulting challenge, in that it is substantially infeasible to manipulate the challenge or other inputs by changing them, and any such secondary input may be considered a secondary input. Also, multiple trap-door operations may be used to pivot a single challenge. These may be arranged so that all the trap doors are needed to manipulate, so that any one of them is sufficient to manipulate, or, more generally, that any monotonic subset of them would be sufficient.

The choice of party names, and the number of parties are examples of choices made for clarity and convenience. Naturally, the inventive concepts disclosed here should not be interpreted as limited to a particular type, grouping, or multiplicity of parties nor should there be any other implications of naming conventions or the like.

Turning now to FIG. 1, general descriptions of the interconnections and cooperation of the constituent pans of some exemplary embodiments of the inventive concepts will now be presented.

Referring specifically to FIG. 1a, the overall process and means for private proof in accordance with the teachings of the present invention will now be presented. The prover is shown on the left and the verifier on the right.

Box 101 shows creation by a verifier party of both trap-door information, such as at random, and the corresponding trap-door operation. An example would be the random choice of two suitable primes as the trap-door information and their product as an encoding of the trap door operation.

Box 102 indicates how a prover party receives an encoding of the trap-door computation from the verifier and forms a private proof responsive to that computation.

Box 103 is the receipt from the prover party of the private proof created by the prover party in box 102 and the verification of the private proof by the verifier party.

Figure 1B:
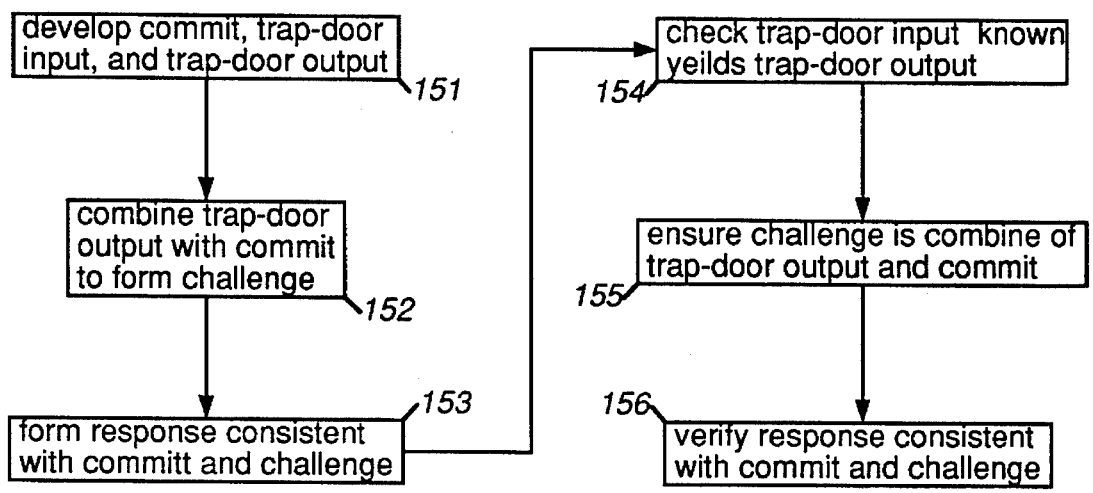
FIG. 1b shows a more detailed combination block, functional and flow diagram of a preferred embodiment of a private signature or proof creation and verification system in accordance with the teachings of the present invention.

Referring now to FIG. 1b, an exemplary embodiment of a private proof creating and verifying in accordance with the teachings of the present invention is shown. The prover is again shown on the left and the verifier on the right.

Box 151 indicates that the prover develops three quantities. Two are related to the trap-door operation: one is its input (called the buff) and the other is its output. A simple way to develop this pair of values would be to create the buff at random and apply the trap-door operation to obtain the output value. Another example approach, without limitation, would be to combine one or more pairs and/or to operate on the components of a pair, all in a way that takes advantage of a suitable structure to preserve the validity of pairs. An illustration of this, with RSA encryption, is where it is believed that component-wise products of input/output pairs are valid pairs and the same power of both components of a pair similarly yields a valid pair.

Commit values are well known in the art of cryptographic protocol design, as can be seen, for example, from "Minimum disclosure proofs of knowledge," G. Brassard, D. Chaum, and C. Crèpeau, journal of Computer and Systems Sciences, vol. 37, no. 2, 1988, pp. 156–189. As their name implies, they are used to fix a choice that will later be challenged for a valid response. Typically a commit is based on private key information and/or random information, and does not make readily computable at least some of this information. An example is a square of a random value in a Fiat-Shamir scheme, although the public key can be regarded as part of the commit.

Box 152 indicates that two values, the trap-door output and the commit are combined to form a third value called the challenge. The combining should leave the output substantially uncontrollable by the prover; however, knowing the trap-door, it is preferably substantially feasible to compute an input for the trap-door computation that yields substantially any desired output of the combining function. This combination may thus pivot on the trap door. The secondary input to the pivoting challenge would be the commit.

Box 153 is the forming of the response value in such a way that it is consistent with the commit and challenge values. Verifying the response should be convincing when it is formed without the trap-door.

The output arrow of box 153 incident on box 154 is intended to show the transfer of the signature or proof from the creating prover to the receiving verifier. As will be appreciated, not all the values—commit, buff, challenge, response need be communicated. Hash compressions or combinations of values may suffice. For example, but without limitation, the buff could be compressed or hashed, as it can be re-constructed by the verifier, or the response could be exclusive-or'ed with the buff, allowing the verifier to reconstruct the response while still being convinced that the prover knew the buff. (It will be appreciated that this last approach makes the whole transmission uncheckable by an eavesdropper.) Any data transmission sufficient to allow the prover to perform the verification will be considered a "communication" of the proof.

Box 154 is where the verifier ensures that the prover did in fact know the buff corresponding to the trap-door output known to the verifier.

Box 155 tests that the challenge is properly formed as the result of applying the agreed combine operation to the trap-door output and the commit.

Box 156 completes the checking of the signature or proof by the verifier confirming that the response is consistent with the commit and challenge values.

Figure 2A:
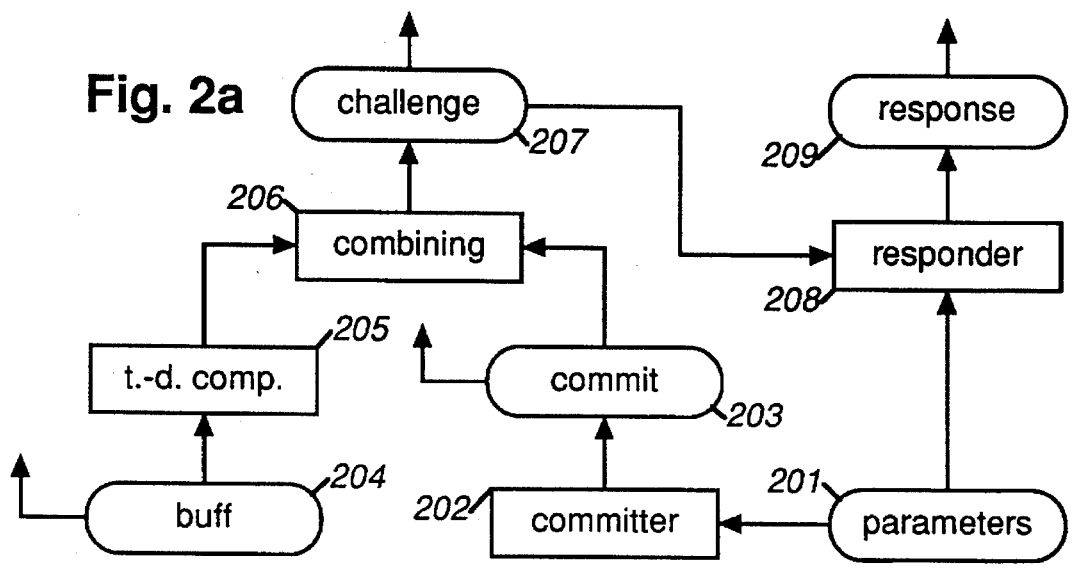
FIG. 2a shows a still more detailed combination block, functional and flow diagram of a preferred embodiment of a private signature or proof creation system in accordance with the teachings of the present invention.

Turning now to FIG. 2, and particularly referring to FIG. 2a, an overall exemplary combination schematic block diagram for a preferred embodiment of a simple private proof method and apparatus in accordance with the teachings of the present invention will now be described.

Parameters 201, at least unknown to at least the verifier party for some time, and preferably confidential to the prover party, might for instance have been the result of a random number generator run by the prover and might be considered private key information corresponding to public key(s) issued by the prover. The parameters 201 are shown as having two outputs, at least one of which should be responsive to any longer-term values; other components of these outputs may be random.

Committer 202 takes input from the parameter values 201, and possibly other values, and produces one or more outputs that depend on the parameter inputs but at least do not allow the inputs to be readily reconstructed. The example of showing the squares having secret square roots was already mentioned. Another know technique is to provide the output of other types of one-way function, possibly even without other structure.

Commit 203 is shown as the output of committer 202. This value is shown, as indicated by the arrow without terminating object, as being sent to the verifier.

Buff 204 is a value that can, as already mentioned, be chosen at random by the prover party, but can be constructed in other ways to be described. It may also be sent to the verifier, although the verifier could construct it from other values, as has already been described.

Trap-door computation 205 takes its input at least from buff value 204, and possibly from random sources. It is not essential that buff 204 is chosen as random input to computation 205, as other ways may be obvious to those of skill in the art to obtain input output pairs for the computation.

One example, already mentioned, would be to take an existing pair and perform an operation on each member of the pair that results in another substantially valid pair, such as by for instance in an RSA or similar system raising both elements to the same power or multiplying component wise by another valid pair. It is believed that any "existentially forgeable" signature scheme may be used, as defined in "A digital signature scheme secure against adaptive chosen message attack," S. Goldwasser, S. Micali, & R. L. Rivest, SIAM Journal of Computing, vol. 17, no. 2, pp. 281–308.

Combining function 206 takes its input from trap door computation 205 and commit value 203, both as already described. The intention here, as mentioned already, is to combine the inputs, in a way that allows substantial control over the output in some cases, and prevents it in others. The example shown distinguishes between the cases, respectively, that the verifier knows or does not know the trap-door information. There might, for instance, without limitation, and as already partly mentioned, be other cases, multiple commits, multiple trap-door outputs, and multiple parties involved in the trap-door information. Some forms of the computation performed by combining means 206 will be detailed further with reference to FIG. 2b.

Challenge value 207 results as the output of combining operation 206, and is shown as being provided to the verifier party. This challenge is preferably pivoted on the trap-door operation with the commit as a secondary input. Also, has been noted, this output value along with that of commit 203 may, for instance, allow buff 204 to be calculated using the trap door information. However, it is believed that the verifier would like to know that the buff was actually known to the prover.

Responder 208 takes input from challenge value 207 and parameters 201. It releases output that reveals more, at least in the sense of what can be readily known by computation, about the parameters, responsive to the what is required by the challenge. In the Fiat-Shamir example, this would be some square roots that do not allow the private key to be determined but which are chosen from a larger set by the challenge. It is believed that the intuition for some known schemes is that if such a response were issued for all possible challenges, then the private key would be revealed and the property proved would also be established; but revealing only enough to satisfy the challenge also convinces because of the uncontrollability of the challenge.

Response 209, the output of responder 208, is the fourth and final value shown, in this exemplary embodiment, as transmitted by the prover to the verifier.

Figure 2B:
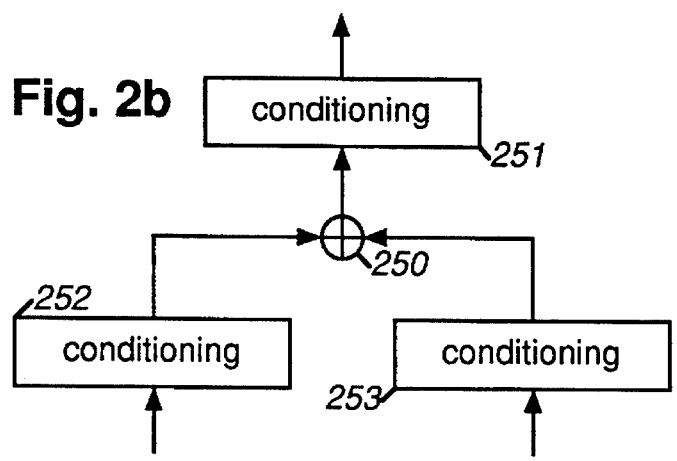
FIG. 2b shows a detailed combination block, functional and flow diagram of a preferred embodiment of a combining function in accordance with the teachings of the present invention.

Referring now to FIG. 2b, an exemplary embodiment of a combining component will now be described in detail.

Simple combiner 250 is shown so as to suggest a bit-wise exclusive-or, modular addition or multiplication. A property, already mentioned, is that knowing the trap door information should allow the output to be manipulated and not knowing it should make such manipulation substantially infeasible. In case attacks are known, or it is felt that the inputs and or outputs are not sure enough to be resistant against manipulation by each other through a simple group operator, more complex combining structures may be desired.

Conditioning mapping 251 removes structure from the output of simple combiner 250, intended as challenge 207, mentioned above.

Conditioning mappings 252 and 253 remove structure communicated between the simple combiner and inputs from trap-door computation 205 and commit value 203, respectively.

Some non-exhaustive example ways to achieve such conditioning mappings will be sketched for completeness. A group operation using a different representation, such as x-or for the simple combiner and modular addition for the conditioning function(s), is a well known way to achieve some protection at low cost. An arbitrary hash or one-way function could be used where invertability is not required, such as is believed may be the case for the commit. Where substantial invertability is needed, such as for the buff 204 and challenge 207, conditioning operations 252 and 251, respectively, a blockcipher structure with non-secret key might be used. The conditioning operation might also provide some conversion, such as conforming the size or representation of its input(s) and output.

DETAILED DESCRIPTION OF PREFERRED EMBODIMENTS

While it is believed that the notation of FIGS. 2–6 would be clear to those of ordinary skill in the art, it is first reviewed here for definiteness.

The operations performed are grouped together into flow-chart boxes. The column that a box is in indicates which party performs the operations defined in that box. The columns are labeled by party name across the top: "P" for prover or signer, "C" for confirmer, and "V" for verifier or recipient.

One kind of operation is an equality test. The "?=?" symbol is used to indicate such a test, and the party conducting the test terminates the protocol if the equality does not hold. (If the test is the last operation to be performed by a party during a protocol, then the success or failure of the test determines the party's success or failure with the protocol.)

Another kind of operation is that of sending a message. This is shown by a message number on the left; followed by a recipient name and an arrow (these appear for readability as either a recipient name then left pointing arrow, when the recipient is on the left: or right pointing arrow then recipient name, when the recipient is on the right); followed by a colon; finally followed by an expression denoting the actual value of the message that should be sent. (These operations are depicted in a "bold" typeface for clarity.) Square brackets are used to delimit message numbers and such an expression stands for the value of the corresponding message.

The further operation of saving a value under a symbolic name is denoted by the symbolic name on the left-hand-side of an equal sign and an expression on the right-hand-side.

Several kinds of expressions are used. One is just the word "random." This indicates that a value is preferably chosen uniformly from an appropriate set of values (defined in the text where not obvious to those of skill in the art) and that is chosen independently of everything else in the protocol. Creation of random values has already been mentioned.

A further kind of expression involves exponentiation. All such exponentiation (unless noted otherwise) is in a single public finite group. When no operation is shown explicitly, multiplication in such a group is assumed.

The particular choice of the group under which the exemplary embodiments may operate is not essential to the invention, however, for completeness some exemplary groups believed suitable will now be discussed along with their representations and some relevant considerations.

One general category of preferred exemplary embodiment would use a group of prime order. Such a group should preferably have a representation for which the already mentioned discrete log problem is believed difficult to solve in practice and for which the group operation and exponentiation are readily performed. Some such groups are now described.

Many suitable groups and representations are known in the art, such as those disclosed in the "Undeniable signature" reference mentioned above. Nevertheless, an exemplary construction believed suitable will now be described for completeness. It is based on the multiplicative group of residue classes modulo q, with $q-1=2p$ and p a prime, whose least positive representatives are less than or equal to p. The group operation is ordinary multiplication modulo p, except that the result is normalized by taking either the product itself or its additive inverse, whichever has the smaller least positive representative. Thus, all integers between 1 and p inclusive may be regarded as representing the members of the group, such membership being easy to check and such members being easy to map to from some original message space.

Figure 3:
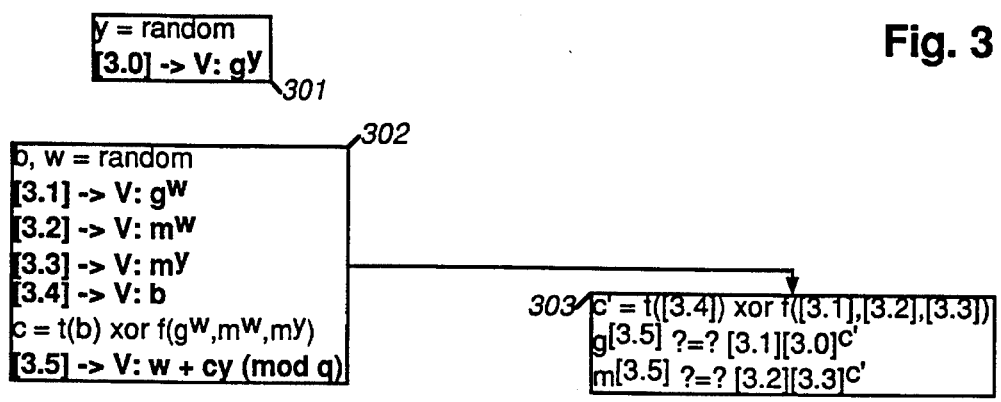
FIG. 3 shows a flowchart of a preferred exemplary embodiment of an undeniable-signature-like private signature issuing and verification protocol between a prover party and a recipient party in accordance with the teachings of the present invention.

Turning now to FIG. 3, a preferred embodiment of an undeniable-signature-style private proof will now be described in detail. It may be thought of as a transaction means or method in which party V is the (intended) recipient such a signature from party P.

Box 301 begins by showing party P first creating a value y at random. Then P is shown forming message [3.0] by taking public generator g to the y power, all in the group of prime order, as mentioned above. This box may be regarded as the creation of the private key and issuing of the corresponding public key of party P.

Box 302 is the issuing of the signature by P to V. It may typically occur much later than box 301. First two values are chosen at random. One is w, which will be an exponent, the other is b, which will be used as the buff for the signature. Four values are easily calculated and sent as messages forming the signature: message [3.1] is the public generator g raised to the w power; [3.2] is the message m, assumed for clarity known to both P and V, raised to the w power: [3.3] is message m raised to the y power from box 301; and [3.4] is the value b already mentioned. Party P is shown for clarity forming challenge c simply as the x-or of two quantities. The first is the trap-door function t applied to the random buff b. The second is the one-way or hash function f (box 253 in FIG. 2b) applied to three values, or, essentially equivalently, to their concatenation. The three values are messages [3.1] through [3.3] as already described. Message [3.5], also sent to V, is formed as the sum of two values, w and the product of c and y, all reduced modulo the order q of the group.

Box 303 is the testing by V of the signature received from P as messages [3.1] through [3.5], as related to the public key received as [3.0]. A temporary variable c' is formed, corresponding to the value c formed by P, to store the value of the challenge computed by V also as the exclusive-or of two values. The first is the trap-door function t, already mentioned, applied to message [3.4]. The second is the one way function f applied to three values, again as already described, messages [3.1] through [3.3]. Two equalities are tested. The first compares generator g, already mentioned, raised to the message [3.5] power, for equality with the product of message [3.1] and the quantity message [3.01] raised to the c' power. The second compares message m, already mentioned, also raised to the [3.5] power, to a product of message [3.21] and the quantity message [3.3]

raised to the c' power. If the two equalities hold, V is convinced of the validity of the signature (assuming it is known that the secrets of V were not used in forming the signature).

Figure 4:
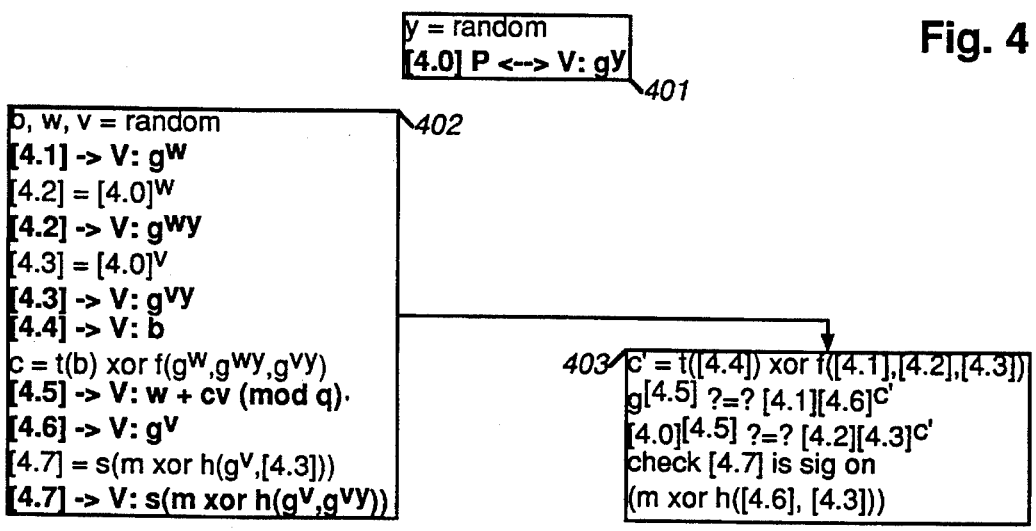
FIG. 4 shows a flowchart of a preferred exemplary embodiment of a designated-confirmer-signature-like private signature issuing and verification protocol between a prover party and a recipient party in accordance with the teachings of the present invention.

Turning now to FIG. 4, a preferred embodiment of a designated-confirmer-like private proof will now be described in detail. It may be thought of as a transaction in which party V is convinced by party P that a signature could be confirmed by party C.

Box 401 begins by showing the creation by C of a private key y at random and the dissemination of the corresponding public key to parties P and V as message [4.0]. Of course there are many ways of getting this public key to P and V.

Box 402 shows how P forms the signature, based in part on the public key issued in box 401, comprising messages [4.1] through [4.7], that will be verified by V. Three values are created at random: buff b and value w, both much as in FIG. 3; and the value v chosen as an exponent, as is w. Message [4.1] is just the generator g raised to the w power. Message [4.2] is the public key, formed by C in box 401, raised to the w power. Message [4.3] is also the public key, but this time raised to the v power. Message [4.4] is simply the value b. The challenge c is formed just as in box 302, by applying the trap door function to b and x-or'ing the result with the hash of [4.1] through [4.3]. Message [4.5], essentially like [3.5] but with v substituted for y, is the sum of the value w and the product of the values c and v, with the output reduced modulo q. Message [4.6] is just g raised to the v power. Message [4.7] is shown as an ordinary digital signature creating operation s, corresponding to a public key of P not shown for clarity. The value signed by s is shown for clarity as the result of an exclusive-or operation. One input to the x-or is the message m, just as in FIG. 3, to be signed. The other input is the result of applying an invertable "cryptographic" function, as described in the above referenced "Designated confirmer signature systems," to the pair of values g raised to the v power and g raised to the power v times y. It will be appreciated that this technique is a generalization of the exemplary embodiments employed in that reference.

Box 403 is the verification by V of the signature comprising the messages [4.1] through [4.7] received form V, corresponding to the public key of C. The temporary value c' is formed, much as c was formed by P, as the exclusive-or of an image under t and one under f. The argument for t is message [4.4] received; that for f is the triple [4.1], [4.2], [4.3]. Two equalities, of similar form to those of box 303, are verified. The left-hand-sides, respectively, are g and [4.0], each raised to the [4.5] power. The fight-hand-sides are, respectively, [4.6] raised to the c' the quantity times [4.1], and [4.3]to the c' the quantity times [4.2]. Finally, V verifies the signature by P issued as message [4.7], which is denoted simply as "check [4.7] is sig on," since this could be any sort of public key signature technique, as already mentioned. The value signed is the exclusive-or of the basic message m and the invertable cryptographic function h applied to [4.6] and [4.3]. If these three conditions are met, V accepts the process as convincing that C could confirm the signature on m by P.

As would be obvious to those of ordinary skill in the art, there are many essentially equivalent orders to evaluate expressions; ways to evaluate expressions; ways to order expressions, tests, and transmissions within flowchart boxes; ways to group operations into flowchart boxes; and ways to order flowchart boxes. The particular choices that have been made here are merely for clarity in exposition and are sometimes arbitrary. Also the order in which messages are generated within a box and sent may be of little or no significance.

It will also be obvious to those of ordinary skill in the art how parts of the inventive concepts and protocols herein disclosed can be used to advantage without necessitating the complete preferred embodiment. This may be more fully appreciated in light of some examples: Pivoted challenges could be used without commits or for other purposes altogether. Public keys could simply be issued along with signatures. Interaction could be used to allow the intended recipient to supply some of the values used in a proof. And the need for preparation, transmission, and verification of data may be reduced by other partial or related proofs known and/or obtained from other sources.

Certain variations and substitutions may be apparent to those of ordinary skill in the art. For example: Most practical trap-door functions or even signature schemes that allow existential forgery could be applied instead of the RSA systems used as an example. And any scheme for involving multiple confirmers could be used.

While these descriptions of the present invention have been given as examples, it will be appreciated by those of ordinary skill in the art that various modifications, alternate configurations and equivalents may be employed without departing from the spirit and scope of the present invention.

What is claimed is:

1. In a cryptographic proof system, in which a prover party is to convince a recipient party of an assertion, the improvement comprising the steps of:

performing at least a first cryptographic operation by said prover party in preparing a first proof of said assertion for said recipient party;

possessing, by said recipient party, of trap-door information corresponding to said first cryptographic operation; and all such that (1) said proof is substantially convincing to said recipient party; and (2) said trap-door information substantially allows said recipient party, having said assertion but without having received said first proof, to develop at least a substantially equivalent proof of said assertion, thereby substantially obscuring at least which of said prover and said recipient parties originated said first proof from parties other than said prover and said recipient parties.

2. In the method of claim 1, said recipient being able to develop substantially equivalent proofs of false assertions.

3. In the method of claim 1, said proof being of the validity of a signature corresponding to a public key of at least one signature party, and said proof allowing a proof by said at least one signature party of validity when said signature is valid and allowing proof of invalidity by said signature party of said signature when an alleged said signature is invalid.

4. In the method of claim 3, said signature party being said prover.

5. In the method of claim 3, said signature party being a third party.

6. In the method of claim 3, said signature party including cooperation of at least two parties other than the recipient.

7. In an undeniable signature system, the improvement comprising the step of: completing a signature showing and a confirmation by a single message sent from the prover party to the recipient party.

8. In a designated confirmer signature system, the improvement comprising the step of: completing a signature showing and a confirmation by a single message sent from the prover party to the recipient party.

9. In a challenge creation method, pivoting the challenge on at least one trap-door operation.

10. In a designated confirmer signature systems, hinging a signature scheme that allows existential forgery.

11. A cryptographic method between a prover party and an intended recipient party, in which said recipient party has trap-door information corresponding to a trap-door operation known to at least said prover party, including the steps of:

developing, by said prover party, of a commit value corresponding to said assertion to be proved;

developing, by said prover party, of an input and a corresponding output of said trap-door operation;

combining, by said prover party, of said input to said trap-door operation and said commit value to form a challenge value, such that substantially any challenge can substantially readily be chosen by a party having said trap-door information corresponding to said trap-door operation and that it is substantially infeasible for a party not having said trap-door information corresponding to said trap-door operation to choose substantially any challenge;

forming, by said prover party, of a response depending on said commit and said challenge, such that said challenge would be convincing to at least said recipient party provided said challenge was substantially uncontrolled by said prover party;

transmitting, by said prover party, and receipt by said recipient party, of information allowing said recipient party to substantially readily develop said commit, said challenge, and said response values;

checking, by said recipient party, that said transmitted information indicates that said challenge was substantially controlled by at least one value computed by said trap-door operation;

ensuring, by said recipient party, that said challenge could be formed as the output of said combining operation applied both to said commit and to said output of said trap-door operation;

verifying, by said recipient, that said commit, said challenge, and said response, form a consistent proof.

12. In a cryptographic proof system apparatus, in which a prover party is to convince a recipient party of an assertion, the improvement comprising:

means for performing at least a first cryptographic operation by said prover party in preparing a first proof of said assertion for said recipient party;

means for storing, by said recipient party, of trap-door information corresponding to said first cryptographic operation; and all such that (1) said proof is substantially convincing to said recipient party; and (2) said trap-door information substantially allows said recipient party, having said assertion but without having received said first proof, to develop at least a substantially equivalent proof of said assertion, thereby substantially obscuring at least which of said prover and said recipient parties originated said first proof from parties other than said prover and said recipient parties.

13. In the apparatus of claim 12, said recipient being able to develop substantially equivalent proofs of false assertions.

14. In the apparatus of claim 12, said proof being of the validity of a signature corresponding to a public key of at least one signature party, and said proof allowing a proof by said at least one signature party of validity when said signature is valid and allowing proof of invalidity by said signature party of said signature when an alleged said signature is invalid.

15. In the apparatus of claim 14, said signature party being said prover.

16. In the apparatus of claim 14, said signature party being a third party prover.

17. In the apparatus of claim 14, said signature party including means for cooperation of at least two parties other than the recipient.

18. In an undeniable signature system apparatus, the improvement comprising the means for: completing a signature showing and confirmation with a single message sent from the prover party to the recipient party.

19. In a designated confirmer signature system apparatus, the improvement comprising the means for: completing a signature showing and confirmation with a single message sent from the prover party to the recipient party.

20. In a challenge creation apparatus, pivoting the challenge on at least one trap-door operation.

21. In a designated confirmer signature system apparatus, hinging a signature scheme that allows existential forgery.

22. Cryptographic apparatus for use between a prover party and an intended recipient party, in which said recipient party has trap-door information corresponding to a trap-door operation known to at least said prover party, comprising:

means for developing, by said prover party, of a commit value corresponding said assertion to be proved;

means for developing, by said prover party, of an input and a corresponding output of said trap-door operation;

means for combining, by said prover party, of said input to said trap-door operation and said commit value to form a challenge value, such that substantially any challenge can substantially readily be chosen by a party having said trap-door information corresponding to said trap-door operation and that it is substantially infeasible for a party not having said trap-door information corresponding to said trap-door operation to choose substantially any challenge;

means for forming, by said prover party, of a response depending on said commit and said challenge, such that said challenge would be convincing to at least said recipient party provided said challenge was substantially uncontrolled by said prover party;

means for transmitting, by said prover party, and receipt by said recipient party, of information allowing said recipient party to substantially readily develop said commit, said challenge, and said response values;

means for checking, by said recipient party, that said transmitted information indicates that said challenge was substantially controlled by at least one value computed by said trap-door operation;

means for ensuring, by said recipient party, that said challenge could be formed as the output of said combining operation applied both to said commit and to said output of said trap-door operation;

means for verifying, by said recipient, that said commit, said challenge, and said response, form a consistent proof.

* * * * *